United States Patent
Engelman

[11] Patent Number: 5,926,126
[45] Date of Patent: Jul. 20, 1999

[54] METHOD AND SYSTEM FOR DETECTING AN IN-PATH TARGET OBSTACLE IN FRONT OF A VEHICLE

[75] Inventor: Gerald H. Engelman, Dearborn, Mich.

[73] Assignee: Ford Global Technologies, Inc., Dearborn, Mich.

[21] Appl. No.: 08/925,244

[22] Filed: Sep. 8, 1997

[51] Int. Cl.⁶ ................................................ G01S 13/93
[52] U.S. Cl. ........................ 342/70; 340/988; 340/435; 701/300
[58] Field of Search ................................. 342/70, 71, 72; 340/903, 933, 935, 988, 435, 436; 701/117, 118, 119, 300, 301, 302

[56] References Cited

U.S. PATENT DOCUMENTS

| | | | |
|---|---|---|---|
| 4,716,298 | 12/1987 | Etoh | 250/561 |
| 5,343,206 | 8/1994 | Ansaldi et al. | 342/70 |
| 5,347,456 | 9/1994 | Zhang et al. | 364/424.02 |
| 5,402,129 | 3/1995 | Gellner et al. | 342/70 |
| 5,467,283 | 11/1995 | Butsuen et al. | 364/461 |
| 5,479,173 | 12/1995 | Yoshioka et al. | 342/70 |
| 5,483,453 | 1/1996 | Uemura et al. | 364/424.02 |
| 5,495,254 | 2/1996 | Uemura et al. | 342/174 |
| 5,563,602 | 10/1996 | Stove | 342/70 |
| 5,585,798 | 12/1996 | Yoshioka et al. | 342/70 |
| 5,617,085 | 4/1997 | Tsutsumi et al. | 340/903 |
| 5,631,639 | 5/1997 | Hibino et al. | 340/903 |

*Primary Examiner*—John B. Sotomayor
*Attorney, Agent, or Firm*—Paul K. Godwin; Roger L. May

[57] ABSTRACT

A method and system for detecting a target obstacle in front of a vehicle traveling on a road includes a radar positioned at a center of the vehicle for transmitting radar waves ahead of the vehicle for use in determining a first position of the objects in front of the vehicle relative to the radar. A lane position measurement device determines a lateral deviation between the center of the vehicle and a lane boundary of the road. Control logic then determines a curvature of the road based on the lateral deviation, independent of the traveling path of the vehicle. The control logic then determines a second position of the objects based on the curvature of the road and the target obstacle based on the second position of the objects.

20 Claims, 4 Drawing Sheets

METHOD AND SYSTEM FOR DETECTING AN IN-PATH TARGET OBSTACLE IN FRONT OF A VEHICLE

TECHNICAL FIELD

This invention relates to methods and systems for detecting an in-path target obstacle in front of a vehicle traveling along a road.

BACKGROUND ART

The essence of an Adaptive Cruise Control (ACC) or Forward Collision Warning (FCW) system is the forward ranging sensor used to detect target vehicles or obstacles in the vehicle's lane or path. The primary sensor used for this purpose has been millimeter wave, frequency modulated continuous wave (FMCW) radar. These sensors are derived from a military background and are capable of accurate measurements of range, range rate, and azimuth to multiple targets within the radar field of view. However, a key component missing from this information is the ability to interpret the acquired target's position in the context of the roadway. Early radar systems made no attempt at discriminating potential targets based on the road geometry. The assumption was the primary target was that which was most aligned with the bore sight of the vehicle. This works fine on long straight roads. However, during curves and lane change maneuvers, the system would often lock onto incorrect targets. Once the system had acquired a target, the advanced target tracking would allow the radar to track the vehicle through curves. However, the acquisition of new targets in these transition maneuvers proved to be a fundamental problem with this most basic sensing system.

Other known systems include a vehicle dynamic based system, such as the system disclosed in U.S. Pat. No. 5,467,283 issued to Butsuen et al., and a far field vision system, such as the system disclosed in U.S. Pat. No. 5,343,206 issued to Ansaldi et al. The vehicle dynamic based system utilizes a lane estimation algorithm based on the dynamic state of the vehicle as measured by an on-board yaw rate gyro. This system assumes that the vehicle is precisely tracking the curvature of the road and, therefore, the measured yaw rate of the vehicle is proportional to the instantaneous curvature of the road. This system also assumes that the driver precisely regulates to the center of the lane with zero heading angle. In the mean, these assumptions must be true if the vehicle is to stay on the road. However, there will definitely be transient situations when these assumptions are not valid.

Far field vision systems utilize a camera to pick up an image of the road ahead of the vehicle. The camera picks up and processes white lines drawn on the road surface ahead of the vehicle to determine the road geometry. These systems, however, are subject to lane mark visibility due to weather (e.g., snow) and traffic conditions (e.g., trucks having large white trailers), flat earth model assumptions and camera motion.

Thus, room for improvement exists in future systems, such as FCW where the system will be called upon to make highly autonomous decisions about the nature of obstacles in the radar field of view.

DISCLOSURE OF THE INVENTION

It is thus a general object of the present invention to provide a method and system for detecting a target obstacle in front of a vehicle traveling along a road based on both the path of the vehicle and the curvature of the road.

In carrying out the above object and other objects, features, and advantages of the present invention, a method is provided for detecting a target obstacle in front of a vehicle traveling along a road wherein the vehicle includes a radar positioned at a center of the vehicle for transmitting radar waves ahead of the vehicle. The method includes the step of determining a first position of at least one object in front of the vehicle relative to the radar based on the radar waves. The method also includes the step of determining a first lateral deviation between the center of the vehicle and a lane boundary of the road. Still further, the method includes the step of determining a curvature of the road based on the first lateral deviation. The method also includes the step of determining a second position of the at least one object relative to the radar and the road based on the curvature of the road. Finally, the method includes the step of determining the target obstacle based on the second position of the at least one object.

In further carrying out the above object and other objects, features, and advantages of the present invention, a system is also provided for carrying out the steps of the above described method. The system includes a radar positioned at a center of the vehicle for transmitting radar waves ahead of the vehicle. The system also includes a lane position measurement device for determining a first lateral deviation between the center of the vehicle and a lane boundary of the road. Still further, the system includes control logic operative to determine a first position of at least one object in front of the vehicle relative to the radar based on the radar waves, determine a curvature of the road based on the first lateral deviation, determine a second position of the at least one object relative to the radar and the road based on the curvature of the road, and determine the target obstacle based on the second position of the at least one object.

The above object and other objects, features and advantages of the present invention are readily apparent from the following detailed description of the best mode for carrying out the invention when taken in connection with the accompanying drawings.

BEST MODES FOR CARRYING OUT THE INVENTION

The present invention defines the movement of the lane marks, or lane boundary, on a road relative to a vehicle. This is done by defining a lateral deviation from a center of the vehicle to the lane boundary and an instantaneous curvature of the lane boundary. The lateral deviation and instantaneous curvature, combined geometrically, define the lane boundary.

Figure 1:
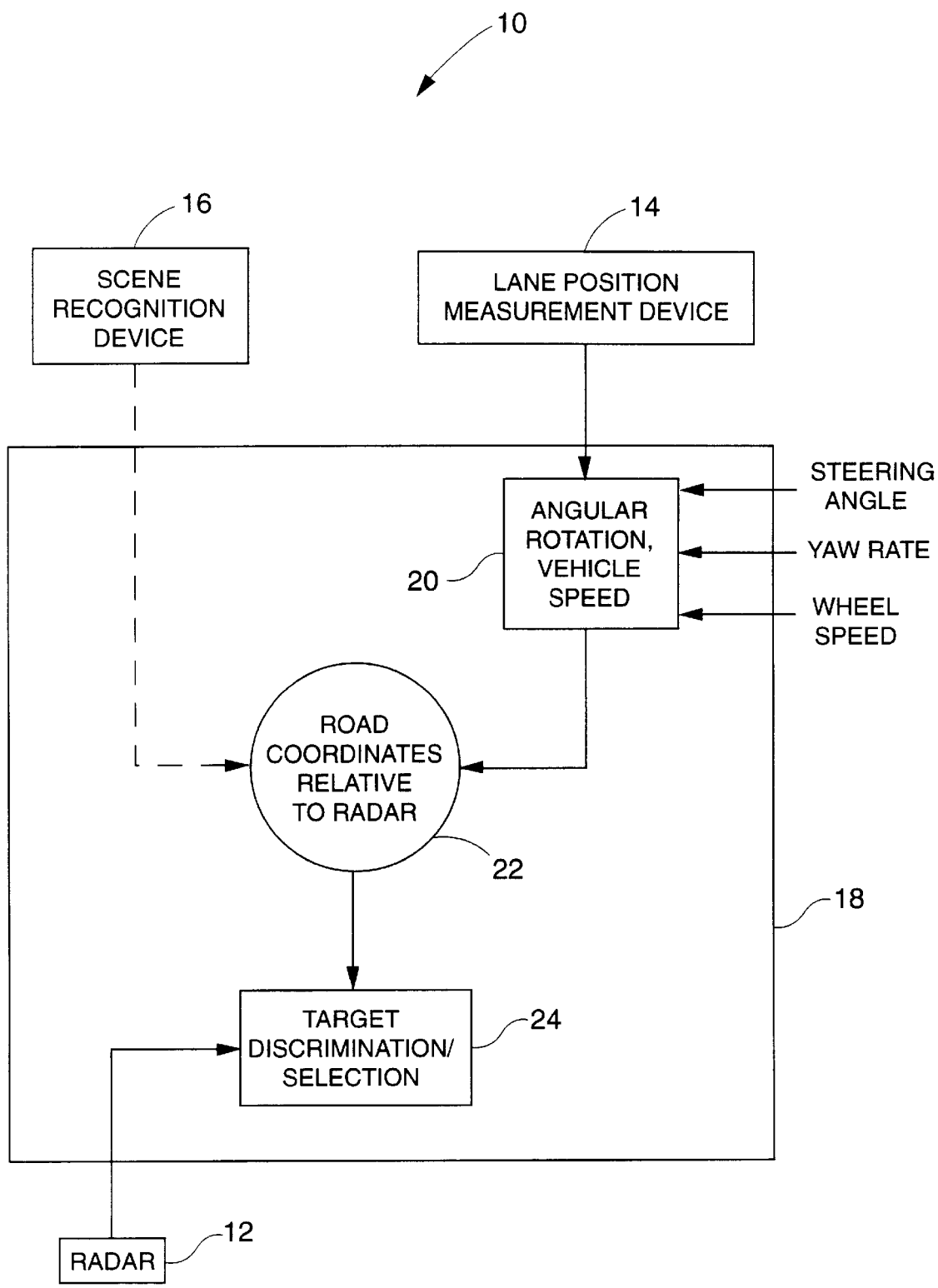
FIG. 1 is a simplified block diagram of the system of the present invention.

Turning now to FIG. 1, there is shown a simplified block diagram of the system employed in the operation of the present invention, denoted generally by reference numeral

10. The system includes a radar 12 positioned at a center of a vehicle for transmitting radar waves ahead of the vehicle in order to detect objects within the field of view of the radar 12. The radar 12 is typically a conventional millimeter wave, frequency modulated continuous wave (FMCW) radar, but may also be an infra-red laser radar or any other similar device.

The system 10 further includes a lane position measurement device 14 to determine the position of the road relative to the radar 12. By determining the position of the road relative to the radar 12, the estimated curvature of the path of the vehicle and the estimated curvature of the road can be distinguished. Previously, the path of the vehicle was assumed to be the path of road. The use of a lane position measurement device 14 allows an absolute reference to the road and therefore gives a more accurate estimation of the future behavior of the road.

The system 10 optionally includes a scene recognition device 16 that is typically utilized in far field systems. The scene recognition device 16, such as a camera, radar, Global Positioning System (GPS) device, may be used in conjunction with the lane position measurement device 14 to recognize transient road assurances such as entrance and exit ramps.

A control logic 18 processes the data generated by lane position measurement device 14 and scene recognition device 16 along with vehicle dynamics 20, such as vehicle speed and angular rotation, to determine the position of the road 22 relative to the radar 12. A target discrimination/selection portion 24 of control logic 18 then determines the position of the object(s) with respect to the radar 12 and the road and selects a target obstacle in the path of the vehicle.

Figure 2:
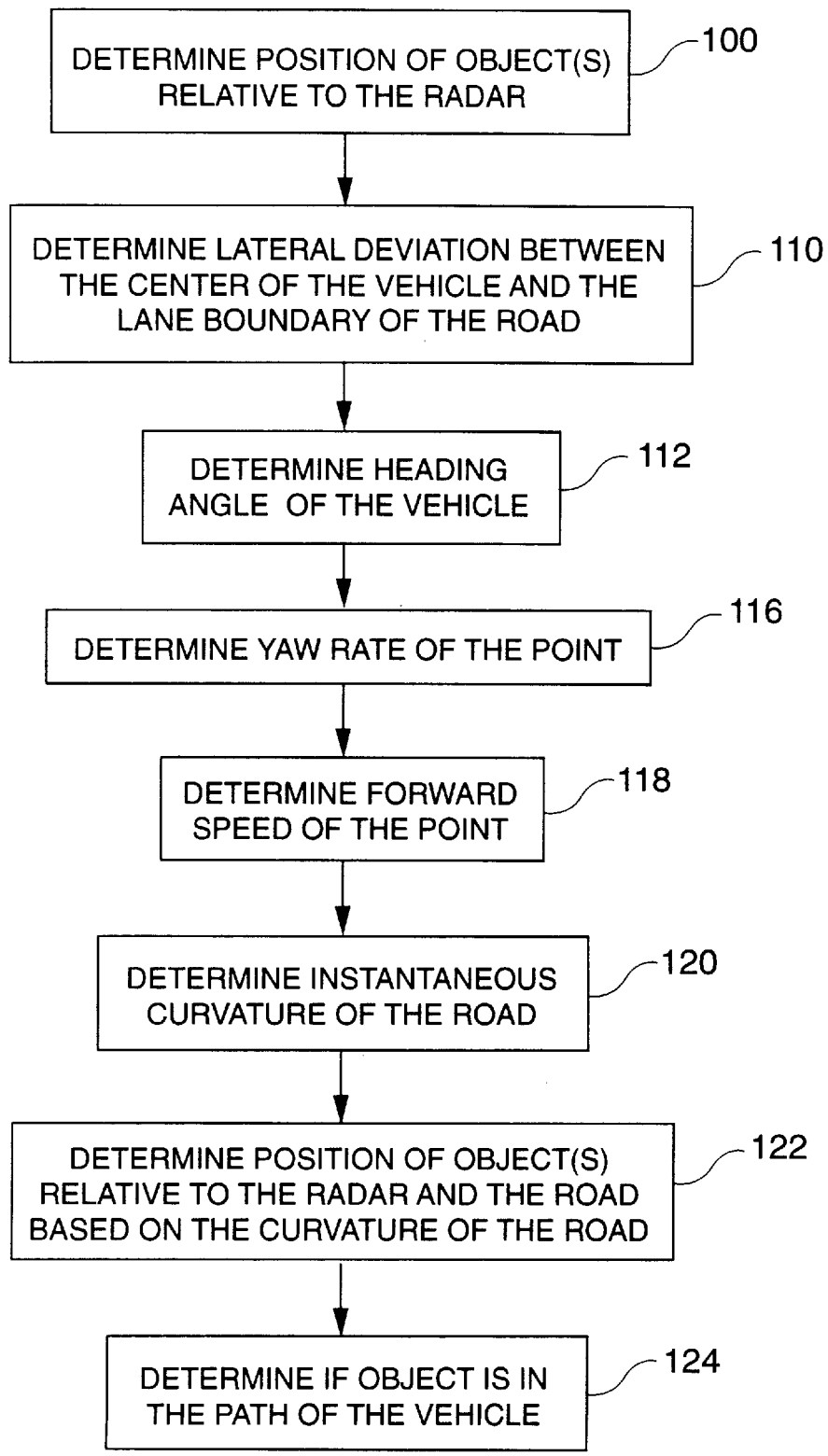
FIG. 2 is a flow diagram illustrating the general sequence of steps associated with the present invention.

The method of the present invention will now be described in greater detail utilizing the flow diagram of FIG. 2. First, a position of an object(s) in front of the vehicle is(are) determined, as shown at block 100. This is accomplished by processing the data received by the radar 12. The radar 12 transmits radar waves in front of the vehicle within a predetermined angle. Based on the time delay and phase difference between the original signals and the received signals, control logic 18 can determine a distance and azimuth angle between each of the object(s) and the vehicle.

Figure 3:
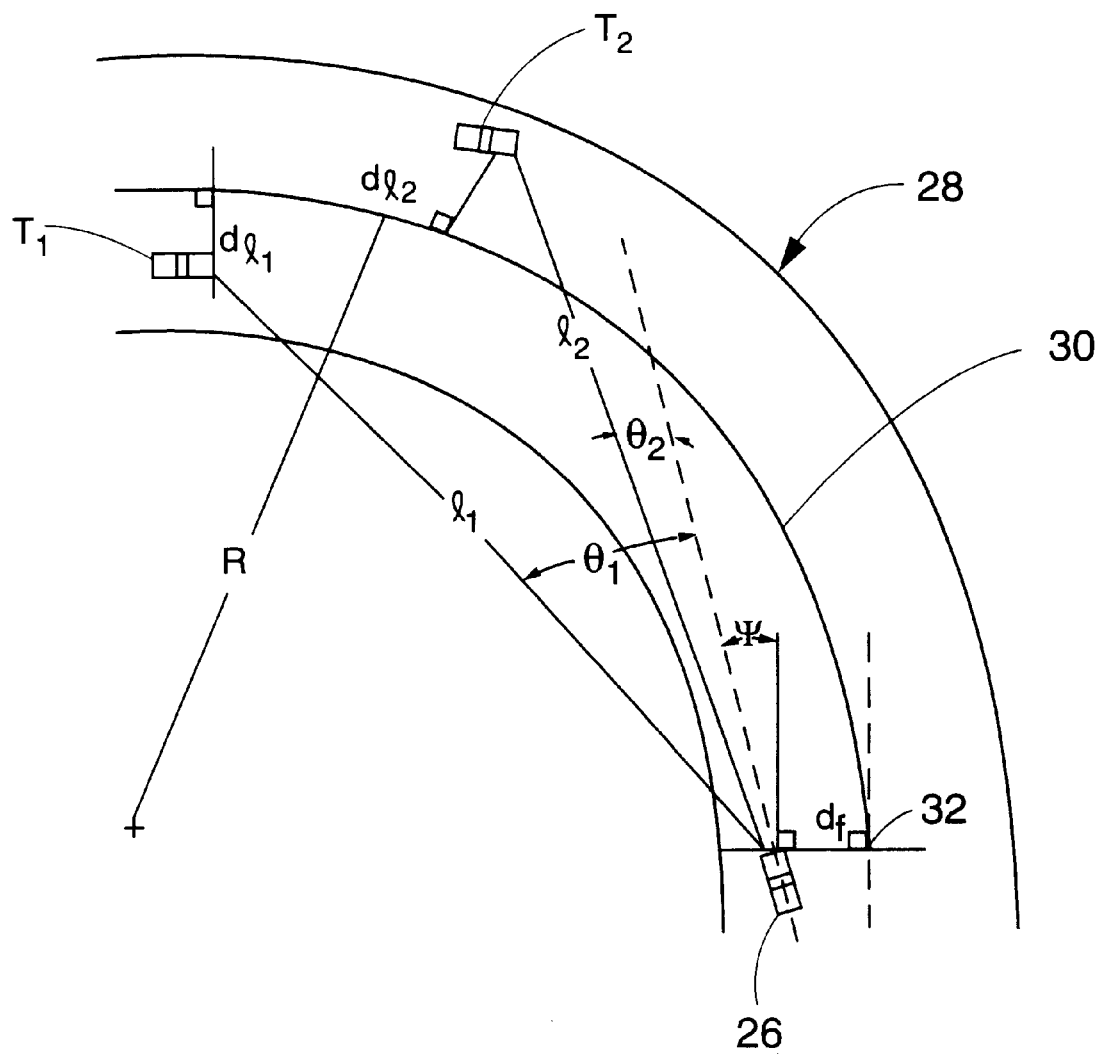
FIG. 3 is a state diagram of a vehicle traveling along a road with two objects in front of the vehicle.

This step may be better understood by referring to the state diagram of FIG. 3. A vehicle 26 is shown traveling along a curved road 28 having a lane boundary 30. A plurality of objects, $T_1$ and $T_2$, are shown in front of the vehicle 26. These objects are determined to be at a distance 11, 12, and an azimuth angle $\theta_1$, $\theta_2$, respectively, from the vehicle 26.

Figure 4:
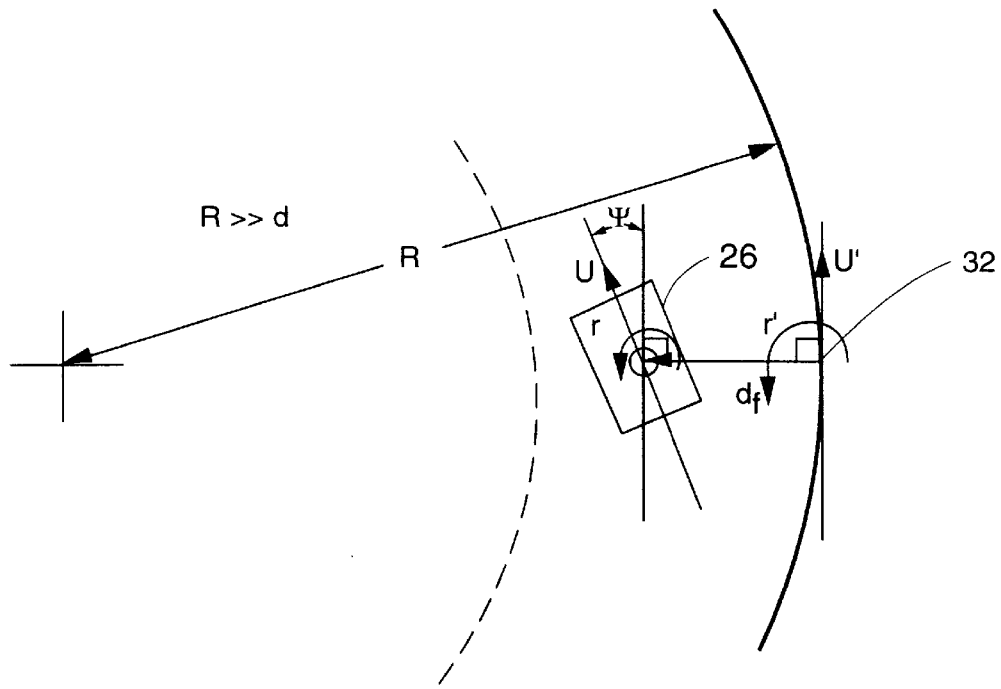
FIG. 4 is a state diagram further illustrating the lane position estimation step of the method of the present invention.

The method proceeds to determine a lateral distance, or lateral deviation, between the center of the vehicle 26 and the lane boundary 30, as shown at block 110. Lane position measurement device 14 may directly measure the lateral deviation, $d_f$, as shown in FIG. 4. The lateral deviation $d_f$ includes a point 32 defined by an intersection of a line perpendicular to a tangent of the lane boundary 30 extended through the center of the vehicle 26 and the lane boundary 30 itself.

The lateral deviation may be measured utilizing a conventional camera. Alternatively, the lateral deviation may be estimated based on GPS/map matching techniques in which a GPS system compares the coordinates of the vehicle 26 with a predefined map to determine the position of the vehicle 26 with respect to the road 28. Still further, lateral deviation may be estimated utilizing other means, such as, for example, magnetic nails/tape positioned on or near the lane boundaries of the road. In this case, a corresponding magnetic sensor would be necessary on the vehicle 26 for receiving the magnetic field generated by the nails/tape.

Once the lateral deviation is determined, the method proceeds to determine the position of the road relative to the radar. In order to do this, a heading angle, $\psi$, representing the direction in which the vehicle 26 is traveling with respect to a tangent of the lane boundary 30. The heading angle can either be measured directly utilizing a camera, or may alternatively be estimated based on the lateral deviation. The heading angle is approximately equal to a derivative of the lateral deviation, i.e., d=U sin$\psi$, where U is the speed of the vehicle 26. The vehicle speed, U, can be measured in any number of conventional ways including, but not limited to, sensing a wheel speed of each of the wheels (not shown) of the vehicle 26 or sensing a speed of the transmission (not shown) of the vehicle 26.

A yaw rate, r', and a forward speed, U', of the point 32 is then determined, as shown at blocks 116 and 118, respectively. This can be better understood by referring to the state diagram of FIG. 4. The point yaw rate is determined based on a vehicle yaw rate, r, and the heading angle as follows: r'=r–$\psi$. The vehicle yaw rate, r, can be measured utilizing a conventional yaw rate gyro or steering angle sensor or by determining a difference between the right and left wheel speeds. The forward speed, U', of the point 32 is determined based on the vehicle speed and heading angle as follows: U'=U cos($\psi$). In practice, U' approximately equals U, since the heading angle is typically a small value.

The instantaneous curvature of the road, C, is determined, as shown at block 120. The instantaneous curvature of the road, when extended from the current vehicle position, defines arcs tangent to the measured road lines. The instantaneous curvature of the road is equal to the point yaw rate, r', divided by the forward speed of the point, U', i.e., C=r'/U'. Note that the instantaneous curvature of the road is equal to an inverse of the radius of curvature, R.

Figure 5:
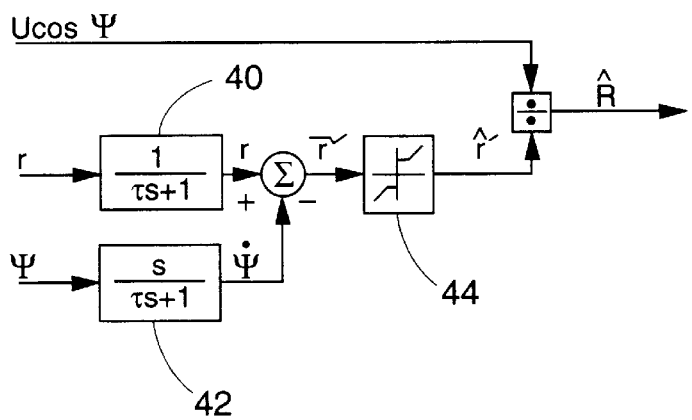
FIG. 5 is a block diagram illustrating the implementation of the operation of the present invention.

The implementation of the lane position estimate strategy of the present invention can best be explained using the block diagram of FIG. 5. The vehicle yaw rate, r, is filtered at 40 to reject measurement noise, and the heading angle, $\psi$, is differentiated and filtered at 42. The time constant can be chosen rather liberally since the only constraint is that the filter should not introduce significant lag to r' estimation. A discontinuity is introduced at 44 around zero to eliminate the possibility of a divided by zero error in the estimation of the radius of curvature.

A preferred discrete implementation of the block diagram of FIG. 5 uses a bilinear approximation to the derivative and is represented by the following equations with T representing the sampling period and k representing the current sample time:

$$\bar{r}[k] = \left(\frac{T}{T+2\tau}\right)(r[k] + r[k-1]) - \left(\frac{T-2\tau}{T+2\tau}\right)\bar{r}[k-1]$$

$$\Psi[k] = \left(\frac{2}{T+2\tau}\right)(\Psi[k] - \Psi[k-1]) - \left(\frac{T-2\tau}{T+2\tau}\right)\Psi[k-1]$$

-continued $$\text{if} \quad (|\bar{r}[k]| < \epsilon),$$
$$\bar{r}[k] = \epsilon sgn(\bar{r}[k])$$
$$\text{else}$$
$$\bar{r}[k] = \bar{r}[k]$$

The choice of $\epsilon$ is determined by the maximum effective radius of curvature that can be represented and should be chosen such that the maximum radius of curvature can represent a straight section of the road with reasonable accuracy.

Upon determining the position of the road relative to the radar, the position of the objects, $d_{11}$, $d_{12}$ (FIG. 3), are determined relative to the radar and the road, as shown at block 122. Given the measurements or estimates of R, l, θ, $d_f$, and ψ, $d_1$ can be determined according to geometry. That is, $d_1$ is determined according to the following:

$$d_l = R - \sqrt{l^2 + (R - d_f)^2 - 2l(R - d_f)\sin(\theta + \Psi)} \quad :R > 0$$

A similar equation is written for R<0 (right hand curve) and is required for proper implementation.

The new distances, $d_1$, are then compared to a measured or assumed lane width, W, to determine if the target is in the path of the vehicle, as shown at block 124.

$$\text{lane position } E \begin{cases} \text{right lane:} & -W \le d_1 < 0 \\ \text{in-path:} & 0 \le d_1 \le W \\ \text{left lane:} & W < d_1 \le 2W \end{cases}$$

This method outlined above contains only the spatial aspects of target discrimination. Due to the high noise levels associated with these measurements and estimations, there are also temporal (filtering) as well as statistical aspects to this method which are not outlined here.

The present invention uses lane position measurement such as lateral deviation and heading angle to decouple the vehicle path from the lane mark position estimates. This provides increased accuracy and robustness over vehicle dynamic only based estimates and circumvents problems associated with far field vision technologies, such as lane mark visibility due to weather and traffic conditions, flat earth model assumptions and camera motion.

While the best modes for carrying out the invention have been described in detail, those familiar with the art to which this invention relates will recognize various alternative designs and embodiments for practicing the invention as defined by the following claims.

What is claimed is:

1. A method for detecting a target obstacle in front of a vehicle traveling on a road, the vehicle having a radar positioned at a center of the vehicle for transmitting radar waves ahead of the vehicle, the method comprising:
    determining a first position of at least one object in front of the vehicle relative to the radar based on the radar waves;
    determining a tangent of the lane boundary of the road;
    determining a line intersecting the tangent perpendicularly through the center of the vehicle and the lane boundary so as to define a point corresponding to a first lateral deviation between the center of the vehicle and a lane boundary of the road;
    determining a curvature of the road based on the first lateral deviation;
    determining a second position of the at least one object relative to the radar and the road based on the curvature of the road; and
    determining the target obstacle based on the second position of the at least one object.

2. The method as recited in claim 1 wherein determining the first position includes:
    determining a distance of the at least one object from the radar; and
    determining an angle between the at least one object and a center of the radar.

3. The method as recited in claim 1 wherein determining the first lateral deviation includes:
    determining a speed of the point; and
    determining an angular rotation of the point.

4. The method as recited in claim 3 wherein determining the speed of the point includes:
    determining a heading angle representative of a direction in which the vehicle is traveling with respect to a tangent of the lane boundary.

5. The method as recited in claim 4 wherein determining the angular rotation of the point includes:
    determining a derivative of the heading angle; and
    comparing the derivative with an angular rotation of the vehicle.

6. The method as recited in claim 1 wherein determining the second position includes:
    determining a second lateral deviation between a center of the at least one object and the lane boundary of the road based on first lateral deviation and the curvature of the road.

7. The method as recited in claim 6 wherein the road has a predetermined lane width and wherein determining the target obstacle comprises comparing the second lateral deviation with the first lateral deviation and the predetermined lane width.

8. A system for detecting a target obstacle in front of a vehicle traveling on a road, the system comprising:
    a radar positioned at a center of the vehicle for transmitting radar waves ahead of the vehicle;
    a lane position measurement device for determining a tangent of the lane boundary of the road and a line intersecting the tangent perpendicularly through the center of the vehicle and the lane boundary so as to define a point corresponding to a first lateral deviation between the center of the vehicle and a lane boundary of the road; and
    control logic operative to determine a first position of at least one object in front of the vehicle relative to the radar based on the radar waves, determine a curvature of the road based on the first lateral deviation, determine a second position of the at least one object relative to the radar and the road based on the curvature, and determine the target obstacle based on the second position of the at least one object.

9. The system as recited in claim 8 wherein the control logic, in determining the first position, is further operative to determine a distance of the at least one object from the radar and determine an angle between the at least one object and a center line of the vehicle.

10. The system as recited in claim 8 further comprising:
    a sensor for sensing a speed of the vehicle and generating a corresponding vehicle speed signal; an angular rotation sensor for sensing an angular rotation of the vehicle and generating a corresponding rotation signal; and wherein the control logic, in determining the curvature, is further operative to determine the speed of the point based on the speed signal, and determine the angular rotation of the point based on the rotation signal.

11. The system as recited in claim 10 wherein the control logic, in determining the speed of the point, is further operative to determine a heading angle representative of a direction in which the vehicle is traveling with respect to a tangent of the lane boundary.

12. The system as recited in claim 11 wherein the control logic, in determining the angular rotation of the point, is further operative to determine a derivative of the heading angle and compare the derivative with the angular rotation signal.

13. The system as recited in claim 8 wherein the control logic, in determining the second position, is further operative to determine a second lateral deviation between a center of the at least one object and the lane boundary of the road based on first lateral deviation and the curvature of the road.

14. The system as recited in claim 13 wherein the road has a predetermined lane width and wherein the control logic, in determining the target obstacle, is further operative to compare the second lateral deviation with the first lateral deviation and the predetermined lane width.

15. A method for determining if an object is a target obstacle in the path of a vehicle traveling on a road, the vehicle having a radar positioned at a center of the vehicle for transmitting radar waves ahead of the vehicle and detecting the object, the method comprising:

determining a first position of at least one object in front of the vehicle relative to the radar based on the radar waves;

determining a tangent of the lane boundary of the road;

determining a line intersecting the tangent perpendicularly through the center of the vehicle and the lane boundary so as to define a point corresponding to a first lateral deviation between the center of the vehicle and a lane boundary of the road;

determining a curvature of the road based on the first lateral deviation;

determining a second position of the at least one object relative to the radar and the road based on the curvature of the road; and determining if the object is in the path of the vehicle based on the second position of the at least one object.

16. The method as recited in claim 15 wherein determining the first lateral deviation includes:

determining a tangent of the lane boundary of the road; and determining a line intersecting the tangent perpendicularly through the center of the vehicle and the lane boundary so as to define a point.

17. The method as recited in claim 15 wherein determining the second position includes:

determining a second lateral deviation between a center of the at least one object and the lane boundary of the road based on the first lateral deviation and the curvature of the road.

18. A system for determining if an object is a target obstacle in the path of a vehicle traveling on a road, the system comprising:

a radar positioned at a center of the vehicle for transmitting radar waves ahead of the vehicle and detecting the object;

a lane position measurement device for determining a tangent of the lane boundary of the road and a line intersecting the tangent perpendicularly through the center of the vehicle and the lane boundary so as to define a point corresponding to a first lateral deviation between the center of the vehicle and a lane boundary of the road; and control logic operative to determine a first position of at least one object in front of the vehicle relative to the radar based on the radar waves, determine a curvature of the road based on the first lateral deviation, determine a second position of the at least one object relative to the radar and the road based on the curvature, and determine if the object is in the path of the vehicle based on the second position of the at least one object.

19. The system as recited in claim 18 wherein the control logic, in determining the first lateral deviation, is further operative to determine a tangent of the lane boundary of the road and determine a line intersecting the tangent perpendicularly through the center of the vehicle and the lane boundary so as to define a point.

20. The system as recited in claim 18 wherein the control logic, in determining the second position, is further operative to determine a second lateral deviation between a center of the at least one object and the lane boundary of the road based on the first lateral deviation and the curvature of the road.

* * * * *